(12) United States Patent
Stanaland et al.

(10) Patent No.: US 6,752,167 B1
(45) Date of Patent: Jun. 22, 2004

(54) FREEZE RESISTANT AUTOMATIC DRAINING WALL HYDRANT WITH DUAL CHECK VACUUM BREAKER

(75) Inventors: William A. Stanaland, Montgomery, AL (US); Stephen L. Buehler, Montgomery, AL (US)

(73) Assignee: Jay R. Smith Manufacturing Company, Montgomery, AL (US)

( * ) Notice: Subject to any disclaimer, the term of this patent is extended or adjusted under 35 U.S.C. 154(b) by 90 days.

(21) Appl. No.: 10/158,531

(22) Filed: May 30, 2002

(51) Int. Cl.⁷ .............................................. F16K 24/02
(52) U.S. Cl. .................................... 137/218; 137/360
(58) Field of Search ................................ 137/218, 360

(56) References Cited

U.S. PATENT DOCUMENTS

| | | | |
|---|---|---|---|
| RE26,235 E | * 7/1967 | Woodford .................... | 137/218 |
| 4,109,671 A | 8/1978 | Hughes et al. .............. | 137/282 |
| 4,221,233 A | 9/1980 | Botnick ...................... | 137/218 |
| 4,286,616 A | 9/1981 | Botnick ...................... | 137/327 |
| 4,712,575 A | 12/1987 | Lair et al. ................... | 137/218 |
| 4,821,762 A | 4/1989 | Breneman ................... | 137/218 |
| 4,844,116 A | 7/1989 | Buehler et al. ............. | 137/360 |
| 4,893,654 A | 1/1990 | Feuz ........................ | 137/614.2 |
| 4,909,270 A | 3/1990 | Enterante et al. .......... | 137/107 |
| 5,012,833 A | 5/1991 | Hunley et al. ................ | 137/15 |
| 5,029,603 A | 7/1991 | Ackroyd ..................... | 137/218 |
| 5,094,261 A | * 3/1992 | Giacomini .................. | 137/218 |
| 5,158,105 A | 10/1992 | Conway ...................... | 137/296 |
| 5,217,039 A | 6/1993 | Hoeptner .................... | 137/218 |
| 5,228,470 A | 7/1993 | Lair et al. .................... | 137/218 |
| 5,228,471 A | * 7/1993 | Hoeptner, III .............. | 137/218 |
| 5,392,805 A | 2/1995 | Chrysler ..................... | 137/218 |
| 5,590,679 A | 1/1997 | Almasy et al. ............. | 137/218 |
| 5,740,831 A | 4/1998 | DeNardo et al. ........... | 137/218 |
| 5,752,542 A | 5/1998 | Hoeptner .................... | 137/218 |
| 5,813,428 A | * 9/1998 | Almasy et al. ............. | 137/218 |
| 6,142,172 A | 11/2000 | Shuler et al. ............... | 137/360 |
| 6,386,223 B1 | * 5/2002 | Hoeptner, III .............. | 137/218 |

OTHER PUBLICATIONS

American Society of Sanitary Engineering, Performance Requirements for Vacuum Breaker Wall Hydrants, Freeze Resistant, Automatic Draining Type. ASSE Standard #1019, 1997, Bay Village, Ohio, 13 pages.

American Society of Sanitary Engineering, Performanc Requirements for Hose Connection Backflow Preventers. ASSE Standard #1052, 1993, Westlake, Ohio, 19 pages.

* cited by examiner

Primary Examiner—Gerald A. Michalsky
(74) Attorney, Agent, or Firm—William S. Ramsey

(57) ABSTRACT

The wall hydrant is automatically draining, providing freeze resistant, and includes protections against contamination of a building's potable water supply from the backflow of water in an attached hose. In particular, a dual check hose connection backflow preventer provides protection against back pressure from a hose fill of water which is elevated 10 feet. In addition, protection is provided from back siphonage due to a reduction of pressure in the potable water system within the building. Finally, a biased open atmospheric vent is located between the two independent checks to further assure the protection against backflow from the hose to the potable water system.

22 Claims, 9 Drawing Sheets

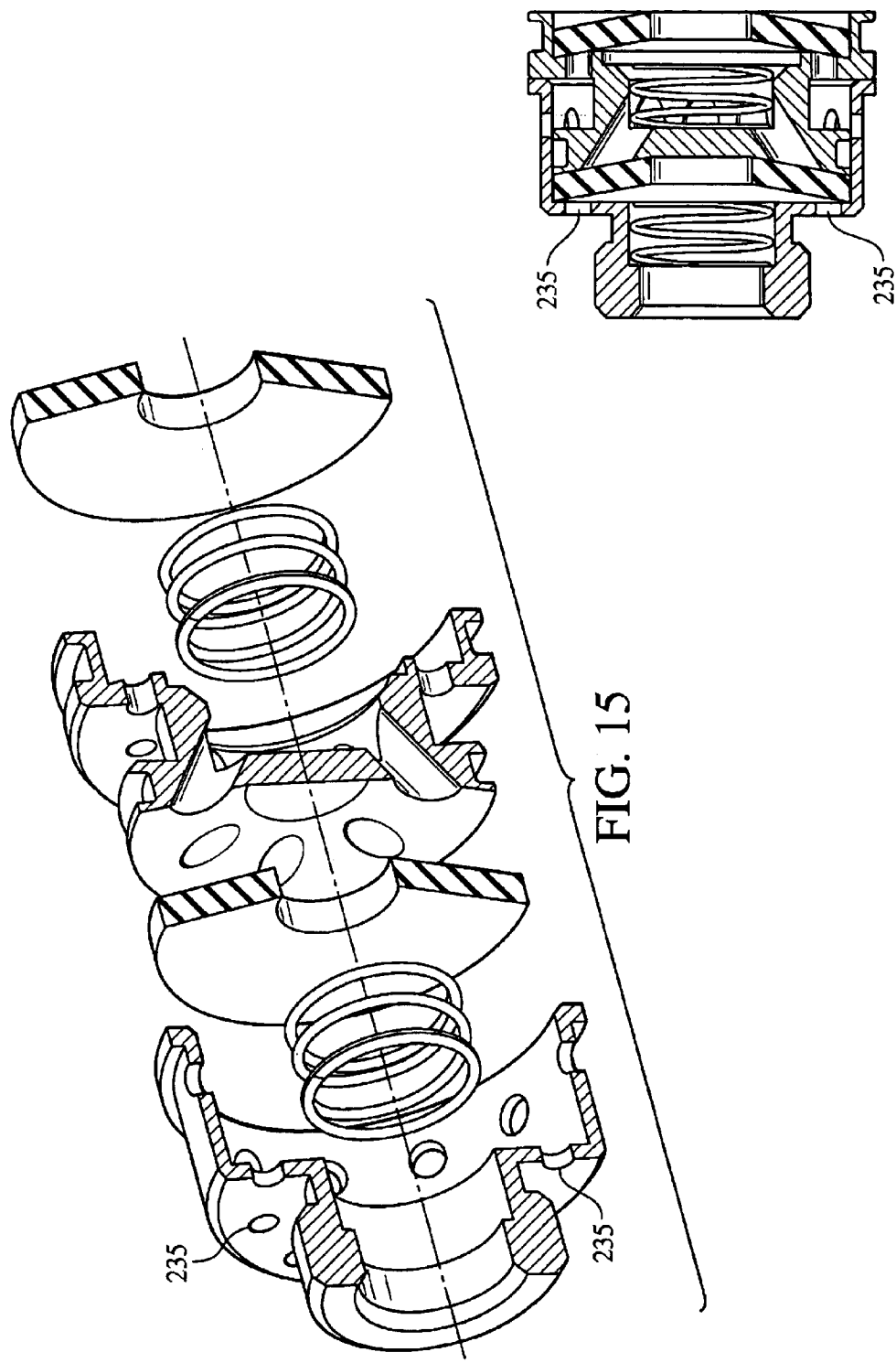

FREEZE RESISTANT AUTOMATIC DRAINING WALL HYDRANT WITH DUAL CHECK VACUUM BREAKER

CROSS-REFERENCE TO RELATED APPLICATIONS.

Not Applicable.

STATEMENT REGARDING FEDERALLY SPONSORED RESEARCH OR DEVELOPMENT.

Not Applicable.

Reference to a "Microfiche appendix."

Not Applicable.

BACKGROUND OF THE INVENTION.

1. Field of the Invention

This invention relates to freeze proof hydrants with provisions for preventing backflow from an attached hose into the water supply system.

2. Description of Related Art Including Information Disclosed Under 37 CFR 1.97 and 37 CFR 1.98.

It is crucially important that a potable water system not be contaminated. A common source of such contamination is water hoses connected to wall hydrants which provide potable water. The water supply within a building normally consists solely of potable water. This water supply also normally is used to provide water for use outside the building through a wall hydrant. Such water is used for watering a lawn, garden, washing a car, etc using a hose attached to the wall hydrant.

A threat to the integrity of the potable water supply inside the building is created when a hose is connected to a wall hydrant, the hose is used, and the water supply is turned off at the wall hydrant. Non-potable water from the attached hose presents a threat to the potable supply on the other side of the hydrant through two separate mechanisms. Pressure from the water in the hose may flow back through the hydrant into the water supply. In addition, a lowering of pressure inside the building may create a back-siphonage condition which causes non-potable water from the hose to enter the potable water system within the building. Finally, freezing of the hydrant may damage the valve in the hydrant and allow backflow from the hose into the potable water system inside the building.

U.S. Pat. No. 4,109,671 discloses a nonfreezing yard hydrant which has provisions for draining the water from the upper portion of the hydrant to below the frost line.

U.S. Pat. No. 4,221,233 and U.S. Pat. No. 4,286,616 disclose a non-freeze wall hydrant which is self-draining and has a comparatively simple vacuum breaker incorporated in the fluid path.

U.S. Pat. No. 4,712,575 discloses a self-draining hose connection vacuum breaker and backflow preventer. The connection is self-draining when no hose is connected and the backflow preventer moves into place when a hose is connected.

U.S. Pat. No. 4,821,762 discloses a freezeless wall faucet which moves from fully open to fully closed position in rotation through 360 degrees. A vacuum breaker is open to the atmosphere except when the faucet is full of water and a spring loaded backflow preventer keeps water from returning from the faucet to the supply line.

U.S. Pat. No. 4,844,116 discloses a quarter turn water hydrant with a valve structure incorporating ceramic components. The disclosures of U.S. Pat. No. 4,844,116 are incorporated herein by reference.

U.S. Pat. No. 4,893,654 discloses a double check valve backflow preventer assembly which uses two separate check valves mounted in series within a single housing to allow flow of fluid in one direction only.

U.S. Pat. No. 4,909,270 discloses a anti-siphon frost free faucet which includes a vacuum breaker, an anti-backflow valve at the hose connection, and a drain valve at the lowest portion of the faucet, the drain valve having a spring-loaded plunger which is biased the open position, and is moved into the closed position when water is flowing-through the faucet.

U.S. Pat. No. 5,012,833 discloses a freeze-proof hydrant which includes a replaceable valve cartridge as well as a backflow preventer at the hose connection.

U.S. Pat. No. 5,029,603 discloses a frost-proof water hydrant which includes two anti-backflow valves and a drain hole and an air valve. Air is admitted to the faucet when the faucet is in the closed position.

U.S. Pat. No. 5,158,105 discloses an anti-siphon freezeless hydrant with a housing integral with a hose connection. Complete closure of the water valve opens holes which admit air into the faucet and encourages drainage of water from the faucet.

U.S. Pat. No. 5,217,039 and U.S. Pat. No. 5,288,470 disclose an automatic draining back flow preventer with two diaphragms and air ports located between the diaphragms. Flow from the faucet causes the first diaphragm to block the air ports while the flow exits through the second diaphragm. Cessation of flow allows the first diaphragm to flex exposing the air ports for drainage of the hydrant, and backflow is blocked by the second diaphragm.

U.S. Pat. No. 5,392,805 discloses a frost-resistant hydrant with a 90 degree ceramic valve having a combination back flow preventer and vacuum breaker in the flow stem.

U.S. Pat. No. 5,590,679 discloses a water hydrant with backflow and siphonage preventer and a vacuum breaker. The backflow preventer is made of elastomeric material which is deflected toward the axis of the cylindrical body during normal flow and is deflected outwardly from the axis to seal the body during backflow.

U.S. Pat. No. 5,740,831 discloses a hydrant seal which is resilient and surrounds the stem and which prevents backflow.

U.S. Pat. No. 5,752,542 discloses a faucet with a resilient annular check valve about the stem which blocks backflow.

U.S. Pat. No. 6,142,172 discloses a freeze protected hydrant with a relief valve which releases water trapped in the hydrant. An annular resilient check valve surrounds the stem and acts as a backflow preventer.

None of the prior art hydrants have the advantages of the hydrants of the present invention, that of being automatically freeze protected, and having dual independent biased check valves with an atmospheric vent biased in an open position located between the two check valves.

BRIEF SUMMARY OF THE INVENTION.

This invention is a wall hydrant which comprises a body having a front and a back, a tubular casing attached at a first end to the back of the body, and a valve assembly attached to the tubular casing at a second end of the tubular casing via a valve housing. The valve housing is connected to a source of water.

A wall plate is attached to the front of the body. A hydrant control knob extends through the wall plate, the hydrant control knob having an open and a closed position. The hydrant control knob is attached to a control tube at a first end, and the control tube is attached at a second end to the valve assembly. The valve assembly admits water into the hydrant when the hydrant control knob is in the open position and the valve assembly does not admit water into the hydrant when the hydrant control knob is in the closed position.

A backflow preventer having an inlet and an outlet is attached to the front of the body at the inlet, the backflow preventer having a hose connector at the outlet, the outlet extending through the wall plate adjacent to the control knob.

The backflow preventer further comprises an inlet check valve and an outlet check valve, each valve biased in a closed position, wherein both the inlet check valve and the outlet check valve prevent flow from the outlet into the hydrant body. An atmospheric vent is located between the inlet check valve and the outlet check valve, the atmospheric vent biased in an open position when water is not flowing through the hydrant and the atmospheric vent dosed when water is flowing through the hydrant.

A wall hydrant comprising: a body having a front and a back, a tubular casing attached at a first end to the back of the body, a valve assembly attached to the tubular casing at a second end of the tubular casing via a valve housing, the valve housing connected to a source of water, a wall plate attached to the front of the body, a hydrant control knob extending through the wall plate, the hydrant control knob having an open and a closed position, the hydrant control knob attached to a control tube at a first end, the control tube attached at a second end to the valve assembly, the valve assembly admitting water into the hydrant when the hydrant control knob is in the open position, the valve assembly not admitting water into the hydrant when the hydrant control knob is in the closed position, and a backflow preventer having an inlet and an outlet, the backflow preventer attached to the front of the body at the inlet, the backflow preventer having a hose connector at the outlet, the outlet extending through the wall plate adjacent to the control knob, the backflow preventer further comprising: an inlet check valve and an outlet check valve, each valve biased in a closed position, wherein both the inlet check valve and the outlet check valve prevent flow from the outlet into the hydrant body, and an atmospheric vent located between the inlet check valve and the outlet check valve, the atmospheric vent biased in an open position when water is not flowing through the hydrant, the atmospheric vent closed by the inlet check valve when water is flowing through the hydrant.

Freeze resistance is obtained by allowing water to drain from the hydrant when the control knob is in the off position. The hydrant has a drain deflector having a fillet, a fixed operator piece having two holes, the fixed operator piece mounted adjacent to the drain deflector, a movable operator piece connected to the control knob, the movable operator piece having two holes, the movable operator piece mounted adjacent to the fixed operator piece, the movable operator piece movable between an open position and a closed position, wherein the holes in the fixed operator piece are aligned with the holes in the movable operator piece when the movable operator piece is in the closed position, thereby allowing water to drain from the hydrant body through the holes in the movable operator piece, the holes in the fixed operator piece, and the fillet in the drain deflector.

The American Society of Sanitary Engineering (ASSE) has published performance requirements for vacuum breaker freeze resistant, automatic draining wall hydrants. American Society of Sanitary Engineering, Standard #1019, Performance Requirements for Vacuum Breaker Wall Hydrants, Freeze Resistant, Automatic Draining Type, Westlake, Ohio, 1997. Such hydrants are freeze resistant through an automatic draining provision which drains the water from the hydrant when water is not flowing through the hydrant. Hydrants which comply with this Standard also are protected against contamination of potable water through backflow of water from a connected hose. The means of prevention of such backflow are termed "vacuum breakers". In particular, such hydrants must be protected against backflow from a hose filled with water with backpressure equal to 10 feet of head pressure. Three distinctive Types of hydrants are classified; Type A are hydrants which automatically drain the water when the water supply is shut off and the hose removed to prevent damage from freezing. Type B hydrants automatically drain the water with a hose removed or attached, and nozzle closed, and the hydrant valve closed. Type C are the same as Type A, but backflow prevention is achieved by alternate principle of holding pressure versus relieving pressure The ASSE has published performance requirements for hose connection backflow preventers. American Society of Sanitary Engineering, Standard #1052, Performance Requirements for Hose Connection Backflow Preventers, Westlake, Ohio, 1994. Such backflow preventers protect against both back siphonage and backpressure backflow of water from a hose. Such devices contain two check valves on the discharge side of a hose threaded outlet on a potable water system and protect against a backpressure generated by an elevated hose equal to 10 feet in height. The checks are independent, force loaded or biased to a closed position. In addition, there must be an atmospheric vent located between the two check valves, force loaded or biased to an open position, and means for attaching a hose.

The hydrants of the present application meet the requirements of both ASSE Standard #1019 Type A and Type B, and ASSE Standard #1052. These hydrants provide superior automatic protection against freezing and against backflow, thereby avoiding the contamination of potable water despite freezing conditions and despite conditions of backpressure or of back siphonage.

An objective is to provide a hydrant with automatic resistance to freezing and freeze damage.

Another objective is to provide a hydrant with automatic resistance to contamination of potable water due to backflow of water from an attached hose.

Another objective is to provide a hydrant with protection against contamination of potable water due to backflow of water due to backpressure.

Another objective is to provide a hydrant with protection against contamination of potable water due to backflow of water due to back-siphonage.

Another objective is to provide a hydrant with a dual check valve backflow preventer.

Another objective is to provide a hydrant which automatically drains the water with a hose attached and nozzle closed, and the hydrant valve closed.

Another objective is to provide a hydrant with dual independent check valves in a backflow preventer.

Another objective is to provide a hydrant with spring biased dual independent check valves in a backflow preventer.

Another objective is to provide a hydrant with an atmospheric vent biased to an open position located between dual check valves.

A final objective of this invention is to provide a hydrant which is easily manufactured of inexpensive materials without adverse effects on the environment.

BRIEF DESCRIPTION OF THE SEVERAL VIEWS OF THE DRAWING

FIG. 15 is an exploded view of the Type B hose connection backflow preventer.

FIG. 16 is a cross sectional view of the Type B hose connection backflow preventer.

DETAILED DESCRIPTION OF THE INVENTION.

Figure 1:
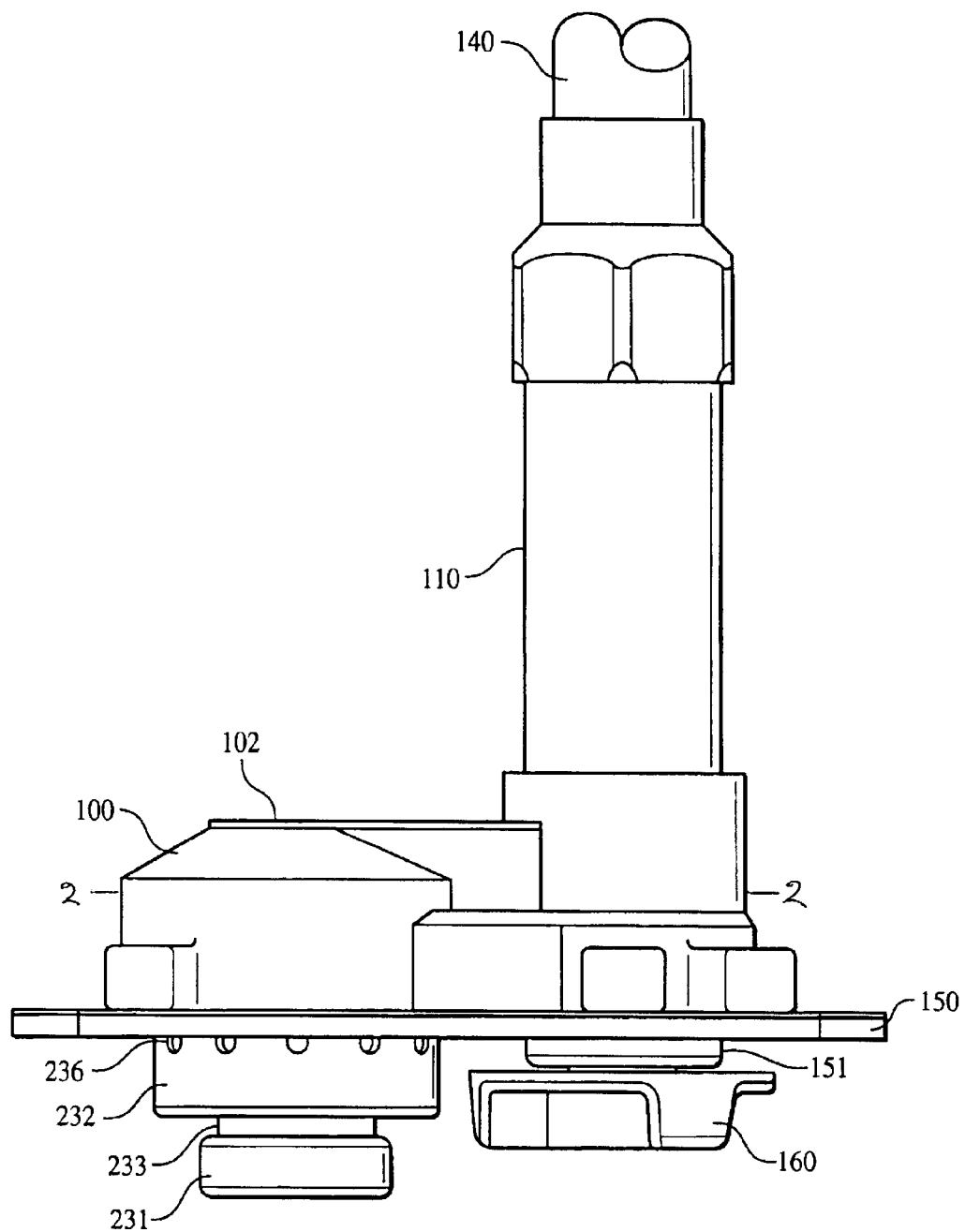
FIG. 1 is a top view of the hydrant.

FIG. 1 is a top view of the hydrant 30. The water supply pipe 140 is attached at the rear of the hydrant by a connector 141 to the tubular casing 110. The tubular casing 110 is attached to the back 102 of the body 100. A wall plate 150 is at the front of the body 100. The cylindrical shoulder 232 of the backflow preventer 200 is visible extending through the wall plate 150. Atmospheric vents 260 are shown on the cylindrical shoulder 232. The neck 233 and hose connector 231 of the backflow preventer 200 are visible. The control knob 160 and drain deflector 151 are also shown.

Figure 2:
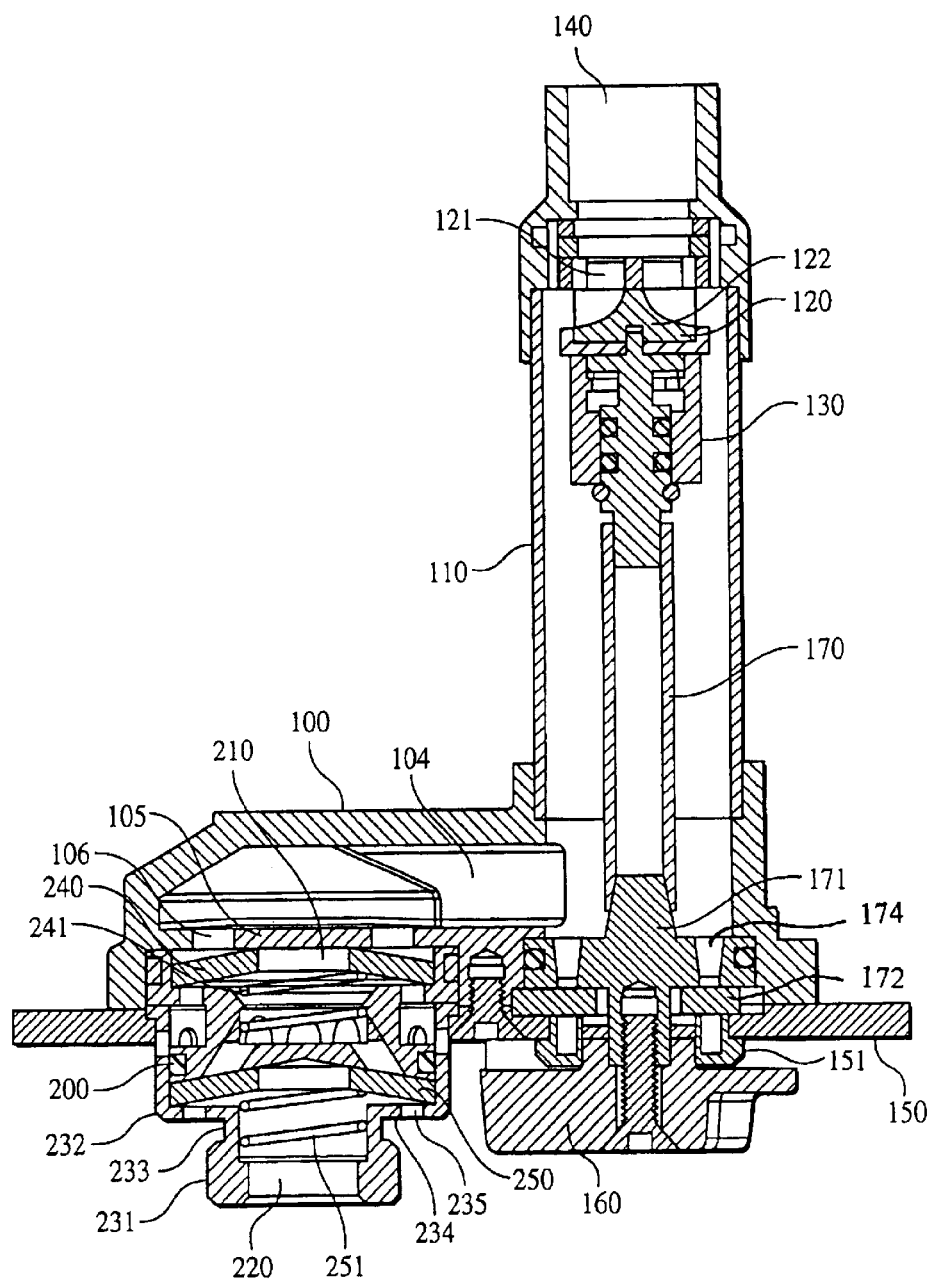
FIG. 2 is a cross sectional view of the hydrant taken along line 2—2 of FIG. 1.

FIG. 2 is a cross sectional view of the hydrant taken along line 2—2 of FIG. 1. Potable water enters the hydrant 30 through the water source pipe 140 attached to tubular casing 110 by the connector 141. Flow of water into the hydrant is controlled by the valve assembly 120 housed in the valve housing 130. A fixed ceramic disk 121 and a movable ceramic disk 122 interact to control the flow of water into the hydrant. Rotation of the movable ceramic disk 122 is controlled by a rotating control tube 170. Rotation of the control tube 170 is controlled by rotation of a movable operator piece 171, which is in turn rotated by a hydrant control knob 160. A wall plate 150 covers the front of the hydrant. A drain deflector 151 is located between the hydrant control knob 160 and a fixed operator piece 172. The movable operator piece 171 is behind and adjacent to the fixed operator piece 172. Two holes 174 in the fixed operator piece are aligned with holes (not visible in FIG. 2) in the fixed operator piece 172 when the hydrant control knob 160 is in the closed position. These holes allow water to flow from the hydrant body into the drain deflector 151 and out of the hydrant body through the drain deflector fillet (152 in FIGS. 5–8). When the hydrant control knob 160 is in the open position the holes 174 in the movable operator piece 171 are not aligned with the holes in the fixed operator piece, and water does not drain from the hydrant body through the drain deflector fillet but fills the hydrant body and exits the hydrant through the hose connection. The drainage of water from the hydrant body when the hydrant is turned off provides freeze protection to the hydrant.

The hydrant body 100 receives the tubular casing 110 at the back, and is covered on the front by the wall plate 150, from which the hydrant control knob 160 and the backflow preventer 200 protrude. A water passage 104 which receives water from the tubular casing 110 is visible in FIG. 2, as well as the water chamber 107 which receives water from the water passage 104. The body plate 105 covers the front of the water chamber 107. A multiplicity of water ports 106 penetrate the body plate 150.

Water leaving the water chamber 107 when the hydrant control knob is in the open position enters the backflow preventer 200 at the backflow preventer inlet 210. Water exits the backflow preventer at backflow preventer outlet 220 via the threaded hose connector 231. The threaded hose connector 231 is connected to a neck 233 which is connected to a cylindrical shoulder 233, which protrudes from a hole in the wall plate 150.

The inlet check valve 240 is biased in the closed position by the inlet check valve spring 241, thereby preventing passage of water from the backflow preventer 200 into the water chamber 107. When the hydrant is turned on flow of water from the hydrant overcomes the inlet check valve 240 allowing water to exit the hydrant via the backflow preventer outlet 220.

Also visible in FIG. 2 is the outlet check valve 250 which is biased in the closed position by the outlet check valve spring 251, thereby preventing flow from the backflow preventer outlet 220 into the backflow preventer 200.

Other details of the backflow preventer are shown in FIGS. 13–22.

Figure 3:
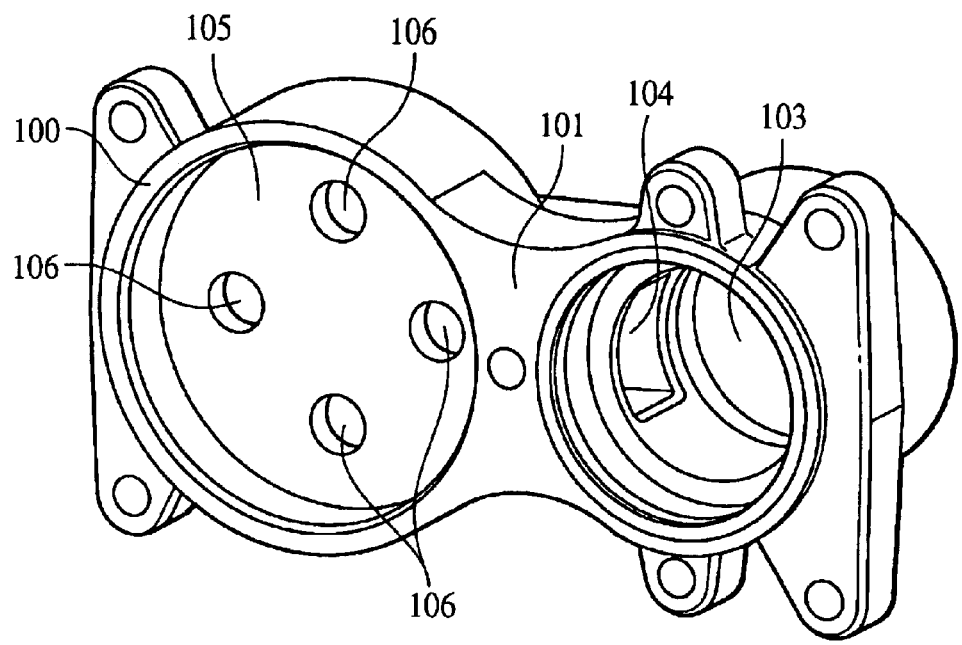
FIG. 3 is a front perspective view of the hydrant body.

FIG. 3 is a front perspective view of the hydrant body 100. The body is an integral casting. Visible in FIG. 3 is the tubular casing passage 103 which receives the tubular casing 110 in the back and from which the control knob 160 protrudes from the front (both tubular casing and control knob not shown in FIG. 3). Also visible in FIG. 3 is the water passage 104 and the drum-shaped water chamber 107. The body plate 105 closes the front of the water chamber 107. The body plate 105 is penetrated by a multiplicity of body ports 106.

Figure 4:
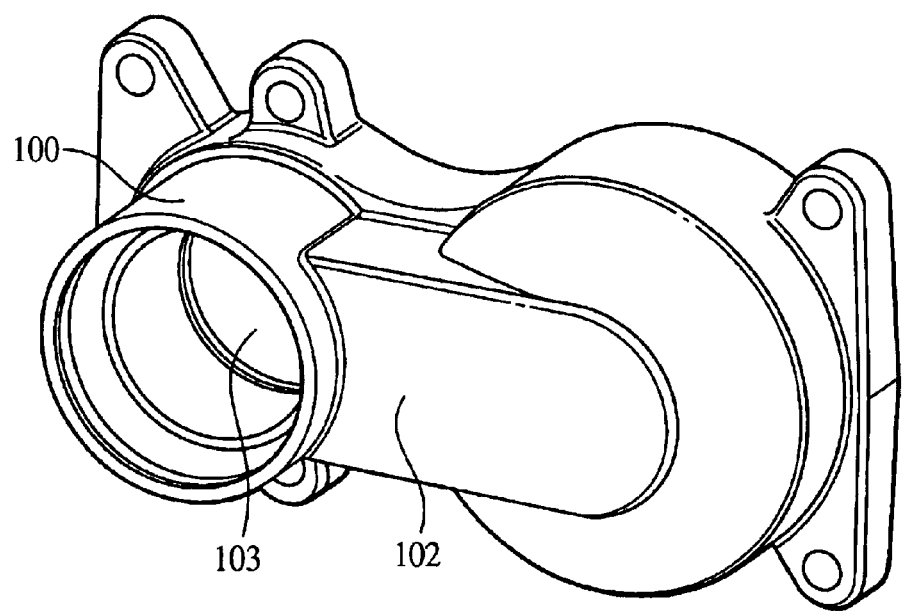
FIG. 4 is a back perspective view of the hydrant body.

FIG. 4 is a back perspective view of the hydrant body 100. Visible in FIG. 4 is the tubular casing passage which receives the tubular casing 110 (not shown in FIG. 4), the back 102 of the body 100, which includes the back of the water passage 104 and the back of the water chamber 107.

Figure 5:
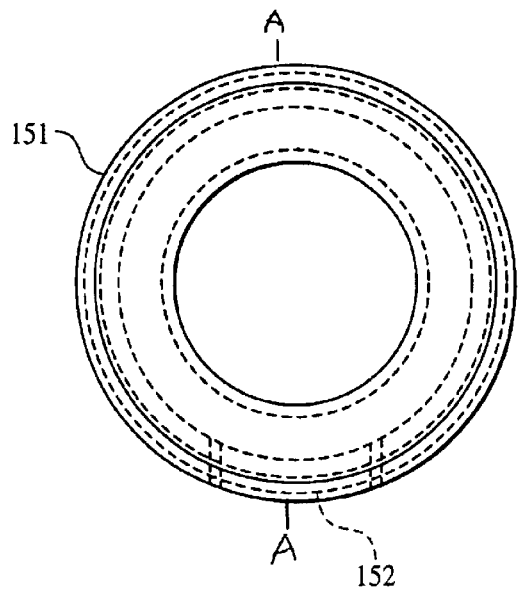
FIG. 5 is a plan view of the drain deflector.

FIG. 5 is a plan view of the drain deflector. Visible in FIG. 5 is the drain deflector and the cutout or deflector fillet 152 at the bottom of the deflector.

Figure 6:
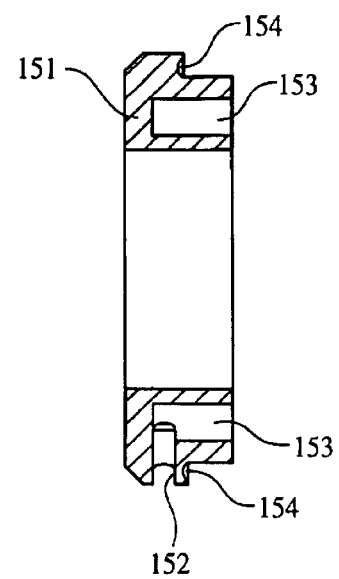
FIG. 6 is a cross section view taken along line A—A of FIG. 5.

FIG. 6 is a cross section view taken along line A—A of FIG. 5. FIG. 6 shows the drain deflector 151, a shoulder 154 which runs around the circumference of the deflector, a groove 153 which runs around the back of the drain deflector, and the fillet 152 which communicates with the groove. When the control knob is in the off position, water is allowed to drain from the hydrant body through holes in the moveable operator piece and through holes in the fixed operator piece. Water then enters the circumferential groove 153 in the drain deflector 151 and drains from the drain deflector through the fillet 152 at the bottom of the drain deflector.

Figure 7:
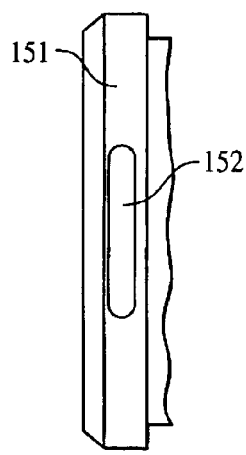
FIG. 7 is a side view of the drain deflector showing the fillet.

FIG. 7 is a bottom view of the drain deflector 151 showing the cutout or drain deflector fillet 152.

Figure 8:
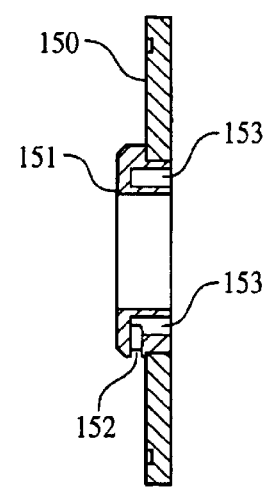
FIG. 8 is a cross section view of the drain deflector installed in the face plate.

FIG. 8 is a cross section view of the drain deflector 151 installed in the face plate 150. A cutout or deflector fillet 152 is visible at the bottom of the deflector. A groove 153 is located around the back circumference of the deflector and connects to the fillet 152. The drain deflector is press fit into a hole in the wall plate 150 and is retained in the hole by a shoulder 154.

Figure 9:
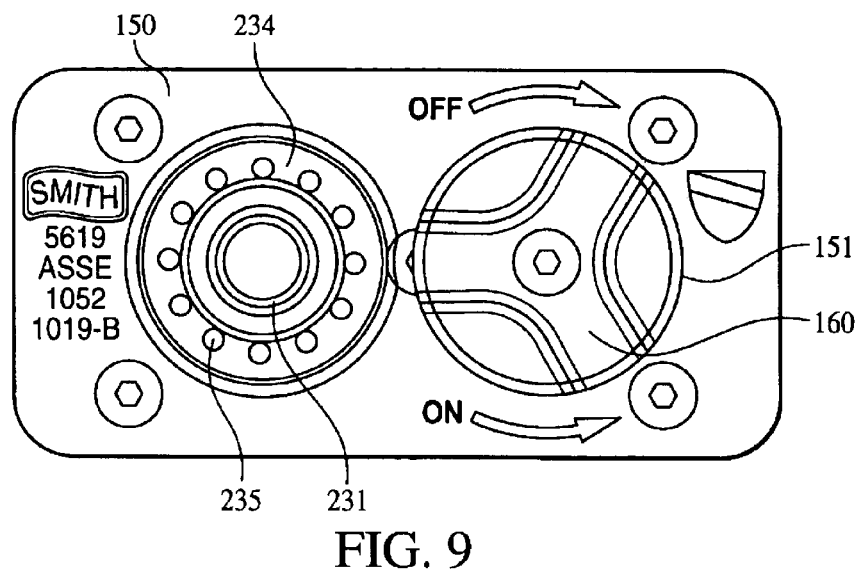
FIG. 9 is a plan view of a hydrant mounted on a wall.

FIG. 9 is a plan view of a hydrant mounted on a wall 109. Visible in FIG. 9 is the wall plate 150 from which protrudes the threaded hose connector 231 and connector wall 234. The hose pressure ports 235 are visible on the connector wall 234. Also visible is the control knob 150 and the drain deflector 151.

Figure 10:
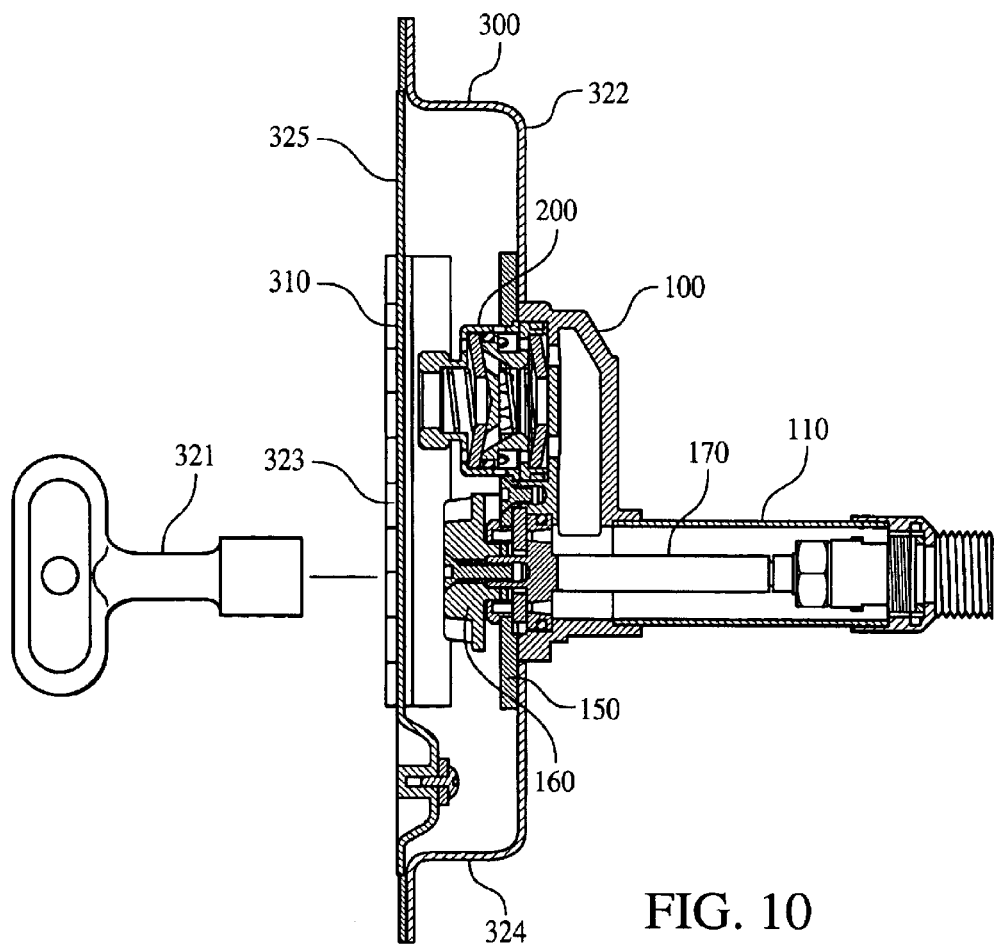
FIG. 10 is a cross section view of the hydrant installed in a box.

FIG. 10 is a cross section view of the hydrant installed in a box 300 mounted on a wall 109. Visible in FIG. 10 is the box key 321, the box front 325, the hinge 323 which is connected to the box door 310, and to the box front 325, the box side 324 and box back 322. Components of the hydrant 30 which are visible include the body 100, tubular casing 110, control tube 170, backflow preventer 200, wall plate 150, and control know 160.

Figure 11:
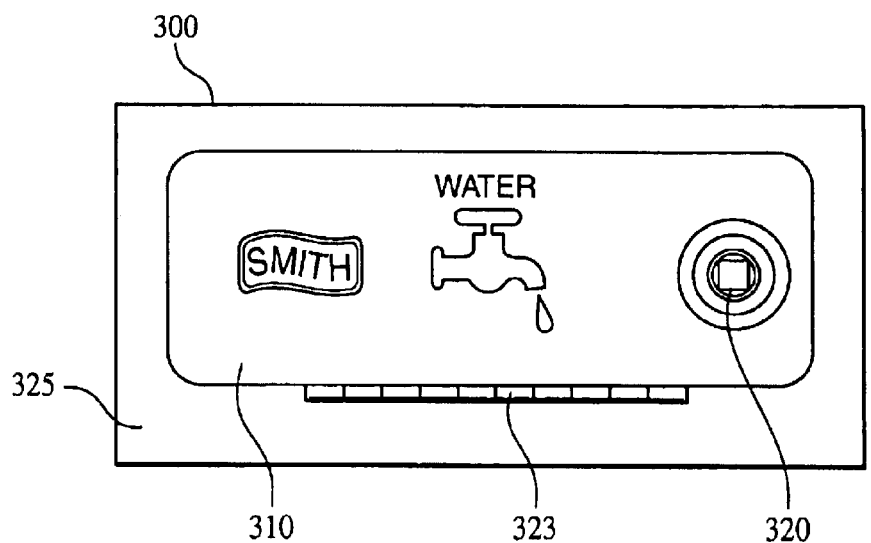
FIG. 11 is a front view of a hydrant box mounted on a wall with the box door closed.

FIG. 11 is a front view of a hydrant box mounted on a wall with the box door closed. Visible is a box front 325, a door 310, a lock 320 and a hinge 323.

Figure 12:
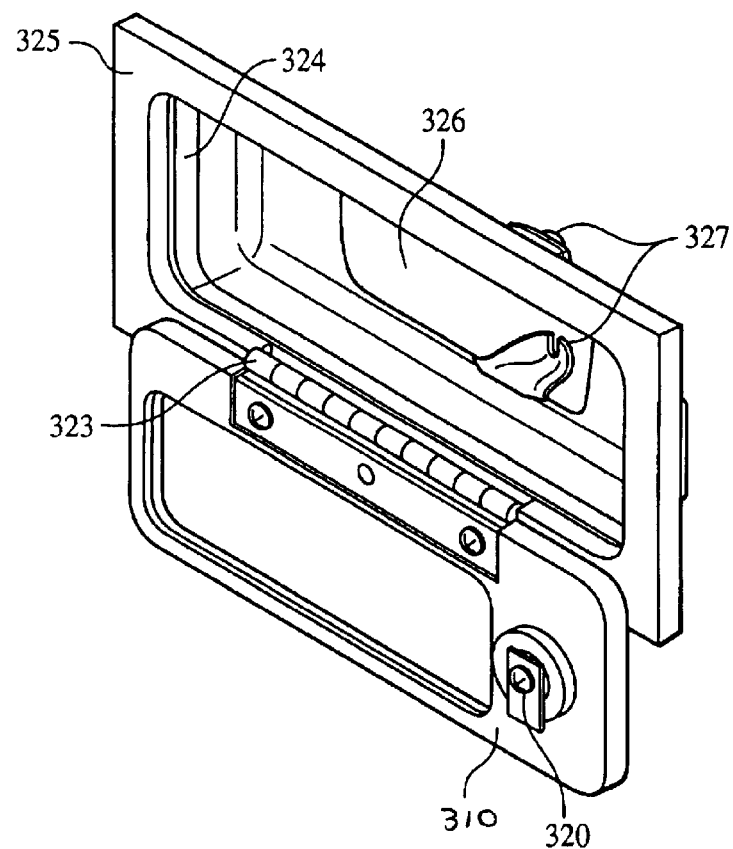
FIG. 12 is a plan view of the hydrant box mounted on a wall with the box door open.

FIG. 12 is a plan view of the hydrant box 300 mounted on a wall with the box door open. In FIG. 12 the door 310, door lock 320, and hinge 323. Also visible is the box front 325, the box side 324, the recess 326 for the wall mounted hydrant body (not shown in FIG. 12) and the ears 327 which retain the hydrant in the box.

Figures 13, 14:
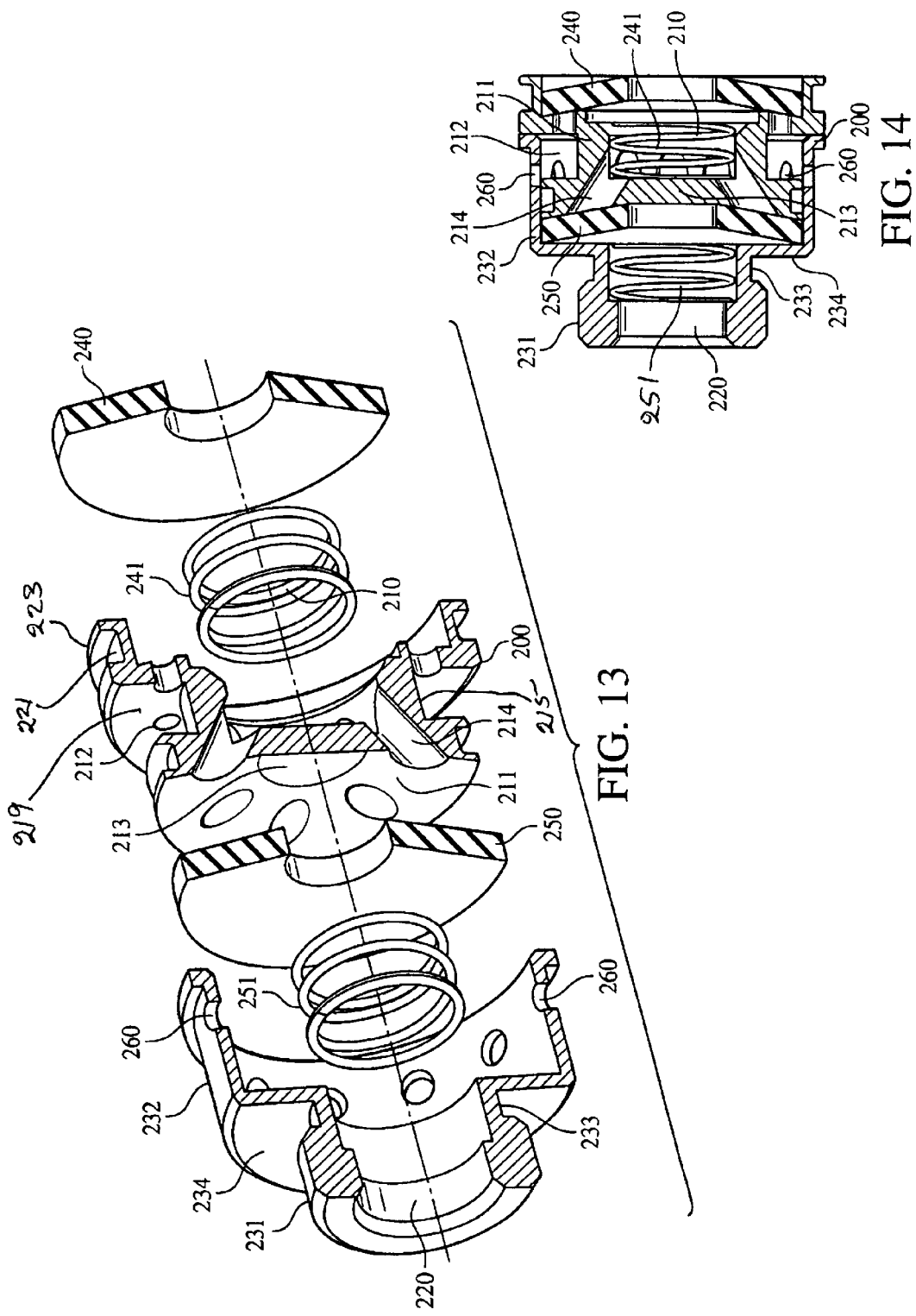
FIG. 13 is an exploded view of the Type A hose connection backflow preventer.
FIG. 14 is a cross sectional view of the Type A hose connection backflow preventer.

FIG. 13 is an exploded perspective view of a Type A backflow preventer 200. Visible in FIG. 13 is the Type A hose connector piece 230. It comprises the hose connector 231 which is connected to a neck 233 which is attached to a washer-shaped connector wall 234 which is connected to a cylindrical shoulder 232 to which is connected a rim 237. The backflow preventer outlet 220 is the lumen of the threaded hose connector 231. A multiplicity of atmospheric vents 260 are arrayed about the cylindrical shoulder 232.

The outlet check valve 250 comprises a cone washer 252 and a spring 251. The intlet check valve 240 comprises a cone washer 242 and a spring 241. The cone washers are manufactured of any suitable durable resilient waterproof material such as plastic, rubber, and silicon rubber. In a preferred embodiment the cone washers are manufactured of silicon rubber, The springs are comprised of any suitable durable resilient material such as plastic, brass, steel and stainless steel. In a preferred embodiment the springs are manufactured of stainless steel.

The internal piece 211 is shown in FIG. 13. The circular front plate 213 is shown along with a multiplicity of internal piece ports 214. A cylindrical neck 215 is attached to the back of the front plate 213 and a washer-shaped back plate 219 attached to the neck 215. The back plate 219 has a multiplicity of chamber vents 218 or ports. A shoulder 221 is attached to the back plate 219. The shoulder 221 has a rim 223 which holds a gasket (not shown) which seals the backflow preventer 200 in place. The back side of the front plate 213 (not visible in FIG. 13), the internal neck 215 and the back plate 219 form three sides of the internal chamber 212. The fourth and final side of the internal chamber 212 is formed by the cylindrical shoulder 232 of the hose connector piece when the backflow preventer is assembled. The back side 216 (not visible in FIG. 13) of the front plate 213 and the inside side 222 (not visible in FIG. 13) of the internal neck 215 form the backflow preventer inflow 210.

FIG. 14 is a cross section of the Type A backflow preventer 200. The elements are the same as in FIG. 13.

FIG. 15 is an exploded perspective view of the Type B backflow preventer. The elements of the Type B backflow preventer are identical to the elements of the Type A backflow preventer with the following exception. The Type B backflow preventer uses the Type B hose connector piece 238. In the Type B hose connector piece 238 the connector wall 234 has a multiplicity of hose pressure ports 235. In all other respects, the Type B hose connector piece 238 is identical to the Type A hose connector piece 230 and FIG. 15 is identical to FIG. 13.

FIG. 16 is a cross section view of the Type B backflow preventer. The elements of the Type B backflow preventer are identical to the elements of the Type A backflow preventer with the following exception. The Type B backflow preventer uses the Type B hose connector piece 238. In the Type B hose connector piece 238 the connector wall 234 has a multiplicity of hose pressure ports 235. In all other respects, the Type B hose connector piece 238 is identical to the Type A hose connector piece 230 and FIG. 16 is identical to FIG. 14.

Figure 17:
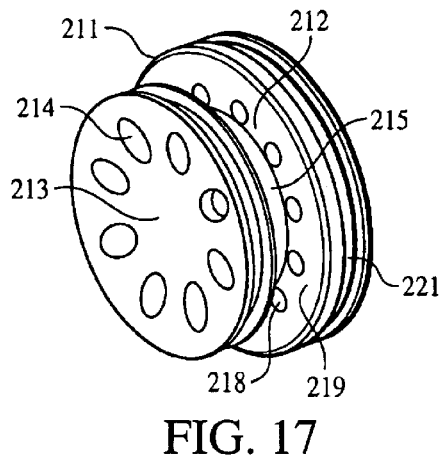
FIG. 17 is a perspective view of the front of the internal piece of the backflow preventer.

FIG. 17 is a front view of the internal piece 211. Visible in FIG. 17 is the circular front plate 213, which is connected to the internal neck 215, which is connected to the circular back plate 219. A cylindrical shoulder 221 is attached to the back plate 219. A multiplicity of internal plate ports 214 penetrates the front plate. A multiplicity of chamber vents 218 penetrates the back plate 219. The back side of the front plate 213 (not visible in FIG. 17), the internal neck 215 and the back plate 219 form three sides of the internal chamber 212.

Figure 18:
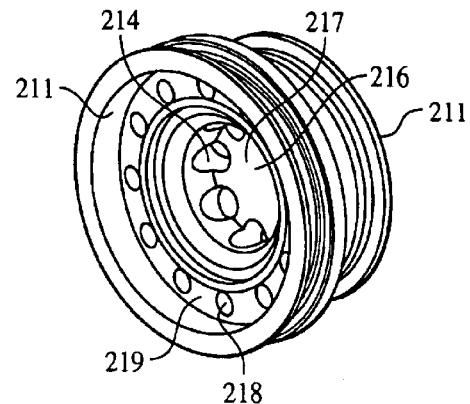
FIG. 18 is a perspective view of the rear of the internal piece of the backflow preventer.

FIG. 18 is a rear view of the internal piece 211. Visible in FIG. 18 is the back side 216 of the front plate 213, which is connected to the inside side 222 of the internal neck 215, which is connected to the circular back plate 219. A cylindrical shoulder 221 is attached to the back plate 219. A multiplicity of internal plate ports 214 penetrate the front plate 213 and are visible on the back side 216 of the front plate 213. A multiplicity of chamber vents 218 penetrates the back plate 219. The back side 216 of the front plate 213 and the inside side 222 of the internal neck 215 form the inlet chamber 217.

Figure 19:
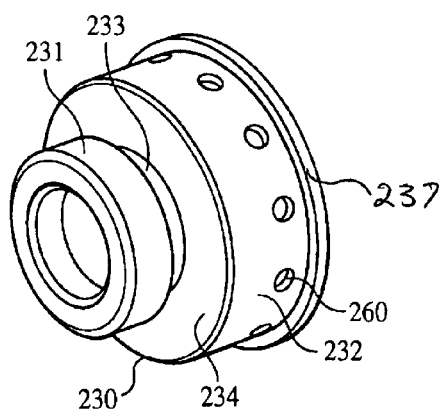
FIG. 19 is a perspective view of the front of the hose connector piece of the to backflow preventer.

FIG. 19 is the front view of the Type A hose connector piece 230. Visible in FIG. 19 is the threaded hose connector 231 which is connected to the neck 233 which is attached to the washer-shaped connector wall 234 which is connected to the cylindrical shoulder 232. A multiplicity of atmospheric vents 260 are arrayed about the cylindrical shoulder 232. A rim 237 attached to the cylindrical shoulder 232 is used to retain a rubber gasket (not shown in FIG. 19) which seals the backflow preventer in place. FIG. 19 shows a threaded hose connector 231, which is the preferred connector. Other suitable connector mechanisms, such as a bayonet-type connector may be used.

Figure 20:
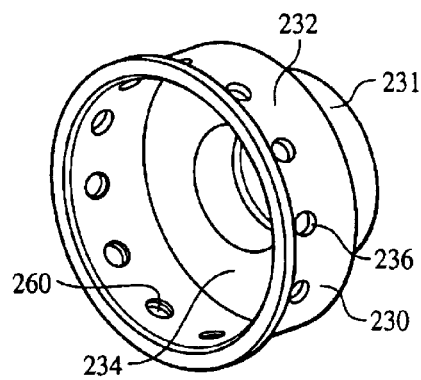
FIG. 20 is a perspective view of the rear of the hose connector piece of the backflow preventer.

FIG. 20 is the rear view of the Type A hose connector piece 230. Visible in FIG. 20 is the cylindrical shoulder 232 which is attached to the washer-shaped corrector wall 234 which is connected to the neck 233 which is connected to the threaded hose connector 231. A multiplicity of atmospheric vents 260 are arrayed about the cylindrical shoulder 232. A rim 237 attached to the cylindrical shoulder 232 is used to retain a rubber gasket (not shown in FIG. 20) which seals the backflow preventer in place. FIG. 20 shows a threaded hose connector 231, which is the preferred connector. Other suitable connector mechanisms, such as a bayonet-type connector may be used.

Figure 21:
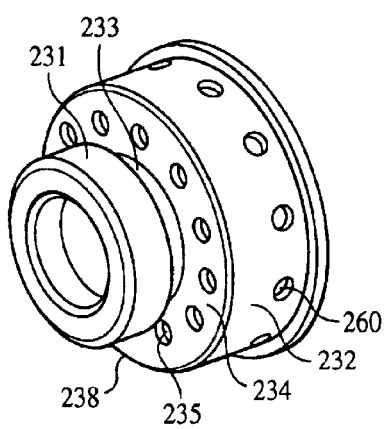
FIG. 21 is a perspective view of the front of the hose connector piece of the backflow preventer.

FIG. 21 is a front view of the Type B hose connector piece 238. The elements of the Type B hose connector piece are identical to the elements of the Type A hose connector piece with the following exception. In the Type B hose connector piece the connector wall 234 has a multiplicity of hose pressure ports 235. In all other respects, FIG. 19 is identical to FIG. 21.

Figure 22:
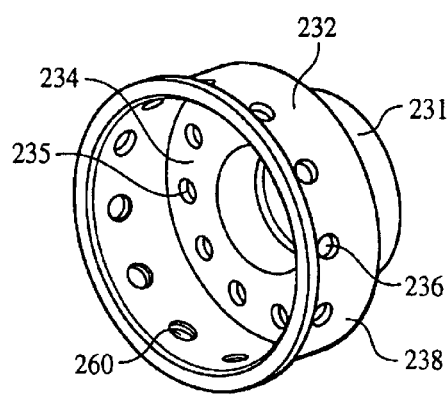
FIG. 22 is a perspective view of the rear of the hose connector piece of the backflow preventer.

FIG. 22 is a rear view of the Type B hose connector piece 238. The elements of the Type B hose connector piece are identical to the elements of the Type A hose connector piece with the following exception. In the Type B hose connector piece the connector wall 234 has a multiplicity of hose pressure ports 235. In all other respects, FIG. 20 is identical to FIG. 22.

The operation of the hydrant is described with reference to FIG. 2. Rotation of the control knob 160 from the closed to the open position causes rotation of the movable operator piece 171, the attached control tube 170 and the valve assembly 120 housed in the valve housing 130. A movable ceramic disk 122 is thereby rotated, causing the alignment of openings in the movable ceramic disk and the fixed ceramic disk 121. Potable water then is admitted through the openings in the fixed ceramic disk and the movable ceramic disk and flows into and fills the tubular casing 110, and the water passage 104 in the body 100. Water flows through ports 106 in the body plate 105 and enters the backflow preventer 200. The water pressure overcomes the bias of the inlet check valve spring 241 and causes the inlet check valve 240 to flex allowing water to enter the backflow preventer inlet 210. The water proceeds through the body of the backflow preventer and the water pressure overcomes the bias of the outlet check valve spring 251 and causes the outlet check valve 250 to flex allowing water to enter the backflow preventer outlet 220. The water then exits the hydrant through the threaded hose connector 231.

Movement of the control knob 160 to the off position moves the movable ceramic disk 122 so that the openings in the movable ceramic disk are not aligned with the openings in the fixed ceramic disk 121 and stops the flow of water into the tubular casing 110. In addition, movement of the control knob to the off position aligns holes 174 in the movable operator piece 171 with holes in the fixed operator piece 172 allowing water in the tubular casing 110 and the body 100 to flow into the drain deflector 151. Water drains from the drain deflector through a fillet and thereby drains the hydrant. This draining of water from the hydrant while the hydrant is turned off provides freeze protection for the hydrant.

The backflow preventer 200 provides two independent check valves, the inlet check valve 240 and the outlet check valve 250, each of which prevents the backflow of water from an attached hose into the hydrant body. In addition, atmospheric vents located between the two check valves act as a vacuum breaker to further reduce the likelihood of backflow.

It will be apparent to those skilled in the art that the examples and embodiments described herein are by way of illustration and not of limitation, and that other examples may be used without departing from the spirit and scope of the present invention, as set forth in the appended claims.

We claim:

1. A wall hydrant comprising: a body having a front and a back, a tubular casing attached at a first end to the back of the body, a valve assembly attached to the tubular casing at a second end of the tubular casing via a valve housing, the valve housing connected to a source of water, a wall plate attached to the front of the body, a hydrant control knob extending through the wall plate, the hydrant control knob having an open and a closed position, the hydrant control knob attached to a control tube at a first end, the control tube attached at a second end to the valve assembly, the valve assembly admitting water into the hydrant when the hydrant control knob is in the open position, the valve assembly not admitting water into the hydrant when the hydrant control knob is in the closed position, and a backflow preventer having an inlet and an outlet, the backflow preventer attached to the front of the body at the inlet, the backflow preventer having a hose connector at the outlet, the outlet extending through the wall plate adjacent to the control knob, the backflow preventer further comprising: an inlet check valve and an outlet check valve, each valve biased in a closed position, wherein both the inlet check valve and the outlet check valve prevent flow from the outlet into the hydrant body, and an atmospheric vent located between the inlet check valve and the outlet check valve, the atmospheric vent biased in an open position when water is not flowing through the hydrant, the atmospheric vent closed by the inlet check valve when water is flowing through the hydrant.

2. The wall hydrant of claim 1 further comprising a box having a back wall upon which the wall plate is mounted, the box containing the hose connector and the hydrant control knob, the box having a hinged door which conceals the hose connector and the hydrant control knob.

3. The box of claim 2 further comprising a lock for securing the door in the closed position.

4. The hydrant of claim 3 further comprising a key for operating the lock.

5. The hydrant of claim 1 mounted on a wall with the wall plate adjacent to the wall and the hose connector and the hydrant control knob extending from the wall.

6. The hydrant of claim 1 further comprising: a drain deflector having a fillet, a fixed operator piece having two holes, the fixed operator piece mounted adjacent to the drain deflector, a movable operator piece connected to the control knob, the movable operator piece having two holes, the movable operator piece mounted adjacent to the fixed operator piece, the movable operator piece movable between an open position and a closed position, wherein the holes in the fixed operator piece are aligned with the holes in the movable operator piece when the movable operator piece is in the closed position, thereby allowing water to drain from the hydrant body through the holes in the movable operator piece, the holes in the fixed operator piece, and the fillet in the drain deflector.

7. The hydrant of claim 1 wherein the control knob turns approximately 90 degrees in going from the closed to the open position.

8. The hydrant of claim 1 wherein the backflow preventer further comprises: drain holes for draining an attached hose having a closed nozzle, the drain holes closed by the outlet check valve when fluid is flowing from the hydrant.

9. The hydrant of claim 1 wherein the check valves are manufactured of waterproof, resilient, elastomer.

10. The hydrant of claim 1 wherein the check valves are manufactured of silicon rubber.

11. The hydrant of claim 1 wherein each check valve is biased in the closed position by a separate spring.

12. The hydrant of claim 11 wherein the springs are manufactured of stainless steel.

13. The hydrant of claim 1 wherein the valve assembly comprises a valve body having a portion anchored to the casing and a portion spaced concentrically from the casing, a stationary valve disk in said valve body, said valve body and stationary disk having opening therethrough in communication with the water supply and a rotatable valve disk having passageways and flat surfaces for selective alignment of the passageways with the openings to selectively open and close the openings for opening and closing the flow path, said valve body including lateral openings aligned with the passageways in the rotatable valve disk to establish a flow path to the interior of the casing when the rotatable valve disk is in the open position.

14. The valve assembly of claim 13 wherein the disks are manufactured of ceramic material.

15. A double check backflow preventer for a hydrant comprising:
a double check valve internal piece, a hose connector piece an inlet check valve, the inlet check valve biased to prevent backflow into the hydrant, an outlet check valve, the double check valve internal piece partially engulfed by a shoulder on the hose connector piece with the formation of an internal chamber, the outlet check valve biased to prevent backflow into the internal chamber, an atmospheric vent admitting the atmosphere into the internal chamber, a chamber vent admitting the atmosphere from the internal chamber into the hydrant, the chamber vent closed by the inlet check valve when water is emitted from the hydrant into the backflow preventer, and the hose connector piece having a threaded hose connector.

16. The backflow preventer of claim 15 further comprising:
a hose pressure port in the hose connector piece, the hose pressure port allowing the flow of water from a connected hose when water is not emitted from the hydrant, the hose pressure port closed by the outlet valve when water is emitted from the hydrant.

17. The backflow preventer of claim 16 wherein the inlet check valve comprises a resilient, waterproof cone washer and a spring.

18. The backflow preventer of claim 16 wherein the outlet check valve comprises a resilient, waterproof, cone washer and a spring.

19. The backflow preventer of claim 15 wherein the inlet check valve comprises a resilient, waterproof, cone washer and a spring.

20. The backflow preventer of claim 15 wherein the outlet check valve comprises a resilient, waterproof, cone washer and a spring.

21. A double check backflow preventer for a hydrant comprising:
an internal piece having a front end and a rear end, the backflow preventer inlet located at the internal piece rear end, a hose connector piece having a front end and a rear end, the backflow preventer outlet located at the connector piece front end, an inlet check valve comprising a resilient, waterproof, cone washer and a spring, an outlet check valve comprising a resilient, waterproof, cone washer and a spring, the inlet check valve located at the rear end of the internal piece, the inlet check valve allowing the passage of water from a hydrant body port into the backflow preventer when water is emitted from the hydrant, the inlet check valve preventing the passage of water from the backflow preventer into the hydrant body through a hydrant body port, the internal piece comprising a washer-shaped back plate, the back plate having a multiplicity of atmospheric ports, a cylindrical neck attached at one end to the front of the back plate, the cylindrical neck attached at a second end to a disk-shaped front plate, the front plate having a multiplicity of front plate ports for the passage of water from the back end of the internal piece through the internal piece front plate to the backflow preventer outlet, the outlet check valve located at the rear end of the outlet connector piece, the outlet check valve allowing the passage of water from the backflow preventer inlet through the front plate ports into the backflow preventer outlet, the outlet check valve preventing the passage of water from the backflow preventer outlet through the internal piece front plate ports into the backflow preventer inlet, the hose connector piece having a front end and a rear end, the hose connector piece having a cylindrical shoulder at the rear end, the cylindrical shoulder having a multiplicity of atmospheric vents arrayed about the circumference of the cylindrical shoulder, the cylindrical shoulder receiving the front plate of the internal piece with the formation of a torus-shaped internal chamber, the internal chamber having as walls the internal piece front plate, the internal piece shoulder, the internal piece back plate, and the hose connector piece cylindrical shoulder, the cylindrical shoulder atmospheric vents allowing the passage of air through the cylindrical shoulder into the internal chamber and the back wall atmospheric ports allowing the passage of air from the internal chamber into the hydrant ports, the back plate atmospheric ports closed by the inlet check valve when water is flowing from the hydrant body ports into the backflow preventer, a washer-shaped hose connector piece wall, the hose connector piece wall connected to the front of the hose connector piece cylindrical shoulder, a cylindrical hose connector piece neck attached at a first end to the front of the hose connector piece wall, and a threaded hose connector attached at a second end to the hose connector piece neck.

22. The double check backflow preventer of claim 21 further comprising:
a multiplicity of hose pressure ports arrayed about the hose connector piece wall, the hose pressure ports closed by the outlet check valve when water is emitted from the hydrant.

* * * * *